United States Patent
Bae et al.

(10) Patent No.: US 8,951,691 B2
(45) Date of Patent: Feb. 10, 2015

(54) SOLID OXIDE FUEL CELL STACK

(75) Inventors: Gyu-Jong Bae, Yongin-si (KR);
Sang-Jun Kong, Yongin-si (KR); Hyun Soh, Yongin-si (KR); Tae-Ho Kwon, Yongin-si (KR); Kwang-Jin Park, Yongin-si (KR); Duk-Hyoung Yoon, Yongin-si (KR); Young-Sun Kwon, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 13/568,986

(22) Filed: Aug. 7, 2012

(65) Prior Publication Data
US 2013/0143137 A1 Jun. 6, 2013

(30) Foreign Application Priority Data
Dec. 6, 2011 (KR) .......................... 10-2011-0129745

(51) Int. Cl.
*H01M 8/24* (2006.01)

(52) U.S. Cl.
USPC ............ 429/452; 429/466; 429/508; 429/517

(58) Field of Classification Search
USPC .......................... 429/517, 466, 507, 469, 497
See application file for complete search history.

(56) References Cited

U.S. PATENT DOCUMENTS

| | | | |
|---|---|---|---|
| 4,728,584 A * | 3/1988 | Isenberg | 429/456 |
| 2005/0147857 A1 * | 7/2005 | Crumm et al. | 429/31 |
| 2008/0118812 A1 * | 5/2008 | Kawakami et al. | 429/38 |
| 2011/0070518 A1 | 3/2011 | Kwon et al. | |
| 2012/0021327 A1 * | 1/2012 | Watanabe et al. | 429/466 |

FOREIGN PATENT DOCUMENTS

| | | | |
|---|---|---|---|
| KR | 2011-0028962 A | 3/2011 | |
| KR | 2011-0030878 A | 3/2011 | |
| WO | WO 2010/114050 | * 10/2010 | H01M 8/02 |

* cited by examiner

*Primary Examiner* — Ula C. Ruddock
*Assistant Examiner* — Osei Amponsah
(74) *Attorney, Agent, or Firm* — Knobbe, Martens, Olson & Bear LLP

(57) ABSTRACT

A solid oxide fuel cell stack is disclosed. In one aspect, the solid oxide fuel cell stack includes unit cells, an external collector, a first stack collecting member, a cap, and a suspension member. The external collector contacts an outer periphery of each of the unit cells and electrically connects the unit cells to each other. The first stack collecting member is positioned to collect current from a distal unit cell. A cap is provided in one end of the distal unit cell. The suspension member has one side thereof suspended from the cap and the other side fixed to the first stack collecting member to distribute weight of the first stack collecting member. Structural stability of a stack collector may be maintained even at oxidizing atmosphere of high temperature when driving the fuel cell stack.

16 Claims, 6 Drawing Sheets

SOLID OXIDE FUEL CELL STACK

CROSS-REFERENCE TO RELATED APPLICATIONS

This application claims priority to and the benefit of Korean Patent Application No. 10-2011-0129745, filed on Dec. 6, 2011, in the Korean Intellectual Property Office, the entire content of which is incorporated herein by reference.

BACKGROUND

1. Field

The present disclosure relates to a solid oxide fuel cell stack having a stack collecting structure with improved structural stability.

2. Description of the Related Technology

A fuel cell stack electrically connects a number of unit cells in parallel and/or in series to obtain the desired amount of current and voltage since the voltage of each unit cell is relatively small. A collecting plate is connected to a final portion of the stack and provides an electrical connection through a stack collector (DC loader). On the other hand, since the current collected from the entire stack flows in the stack collector, a sectional area of the stack collector is larger than each individual unit cell collector sectional area. In cylindrical solid oxide fuel cells, the stack collector may be formed of silver (Ag) having high temperature oxidation resistance. Due to the nature of silver, however, at oxidizing atmosphere and high temperature the physical strength of the silver may be weakened. Further, a peak portion of the stack collector is likely to disconnect because of the stack collector weight and other wire(s) connected to the stack collector.

SUMMARY OF CERTAIN INVENTIVE ASPECTS

In one aspect, a fuel cell stack collecting structure capable of distributing a stack collector load is provided.

In another aspect, a stack collecting structure is provided capable of preventing disconnection of the stack collector even at high temperature oxidizing atmosphere.

In another aspect, a solid oxide fuel cell stack is provided, which includes unit cells, an external collector, a first stack collecting member, a second stack collecting member, a cap and a suspending member.

In another aspect, a stack is formed by a plurality of unit cells.

In some embodiments, the stack includes, for example, an external collector, a first stack collecting member, a second stack collecting member, a cap and a suspending member. In some embodiments, the external collector is positioned to contact an outer periphery of each of the plurality of unit cells. In some embodiments, the external collector is configured to collect electricity from each of the unit cells and electrically connect the plurality of unit cells to each other. In some embodiments, the first stack collecting member is configured to collect electricity from distal unit cells among the plurality of electrically connected unit cells. In some embodiments, the second stack collecting member is fixed to the first stack collecting member to electrically connect to a load.

In some embodiments, the stack further includes a cap is provided in one end of the distal unit cell. In some embodiments, a suspension member is provided. In some embodiments, one side of the suspension member is suspended from the cap and the other side is fixed to the second stack collecting member. In some embodiments, the suspension member is configured to distribute the weight of the first and second stack collecting member. In some embodiments, the first stack collecting member may form at least two electrical paths from the plurality of unit cells to the second stack collecting member. In some embodiments, a connecting member fixes the first stack collecting member to the second stack collecting member.

In some embodiments, the suspension member is fixed to the connecting member. In some embodiments, the suspension member may be formed in a wire shape. In some embodiments, the suspension member is formed of heat-resistant nickel alloys. In some embodiments, the suspension member 160 may be formed of a material having a melting point between about 1500° C. and about 1600° C. In some embodiments, the cap may be formed with a transverse perforation representing a through hole. In some embodiments, the suspension member is positioned suspended from and perforating the through hole. In some embodiments, the cap may be formed with a groove positioned transversely from the top. In some embodiments, the suspension member is suspended from the groove. In some embodiments, the cap may be formed of the material having a thermal expansion coefficient difference of about 5% from that of the material forming an outer periphery of the plurality of unit cells. In some embodiments, the cap may be formed of a nonconductive material. In some embodiments, the cap may be formed of a ceramic material.

In some embodiments, a supporting member including a body fixed to the unit cells, and a supporter extending from the body and supporting the top of the first stack collecting member may be included. In some embodiments, the body may be formed in a ring shape such that one end of a unit cell may be inserted therein. In some embodiments, the body is formed in a strip shape contacting a longitudinal direction of each of the plurality of unit cells. In some embodiments, the external collector is wound by the outer periphery of the unit cells and an outside of the body.

In some embodiments, the supporter may be formed in the shape of a downwardly curved surface. In some embodiments, the unit cells may be formed of a tubular type. In some embodiments, the center axis of each of the plurality of unit cells may be arranged vertically. In some embodiments, the cap may be provided in the top end of at least one of the plurality of unit cells.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
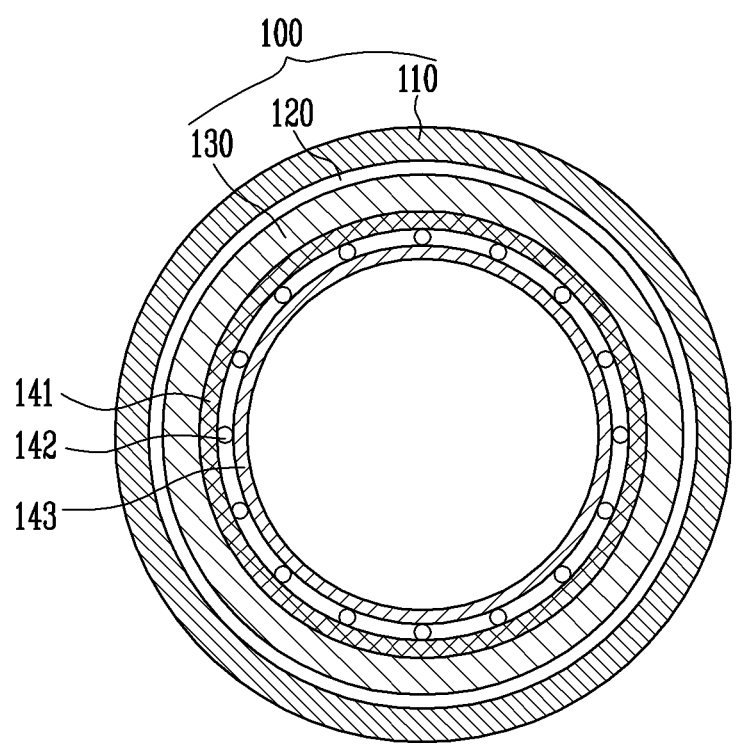
FIG. 1 is a cross-sectional view showing an interlayer configuration of unit cells according to an embodiment.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, embodiments of the disclosure will be described with reference to the attached drawings. Without particular definition or mention provided, terms that indicate directions used to describe the disclosure are based on the state shown in the drawings. Further, the same reference numerals indicate the same members in the embodiments. On the other hand, a thickness or a size of each component displayed on the drawings may be exaggerated for the convenience of the description, which does not mean that it should be estimated by the ratio between its size and the component.

Hereinafter, a tubular unit cells refers to the unit cells of a hollow pipe type without regard to the shape of the cross section. That is, in the tubular unit cells, the shape of the end in the vertical direction to the central axis thereof may be variously formed by circle, oval, polygon and the like.

General fuel cells include a fuel converter (a reformer and a reactor) configured for reforming and supplying the fuel, and the fuel cell modules. Here, the fuel cell modules may include a fuel cell stack configured for converting chemical energy into electrical energy and thermal energy by electrochemical methods. That is, the fuel cell module may include a fuel cell stack, a pipe system, an interconnection and the like. The stack, which may include a set of the unit cells, refers to the portion converting chemical energy into electrical energy and thermal energy. The pipe system refers to a facility configured for moving fuel, oxide, cooling water, discharge and the like. The interconnection refers to an electrical moving path configured for transferring electricity produced by the stack. In addition, the fuel cell module may include a portion configured for monitoring and controlling the stack, and a portion configured for performing measures when the stack is abnormal. Of these, the present disclosure relates to a stack collecting structure configured for transferring electrons generated by an oxidation reaction in a plurality of unit cells outside the stack. In various embodiments, a solid oxide fuel cell stack includes unit cells, an external collector, a first stack collecting member, a second collecting member, a cap and a suspending member as main components. Hereinafter, each component will be described in detail with reference to the drawings.

Figure 2:
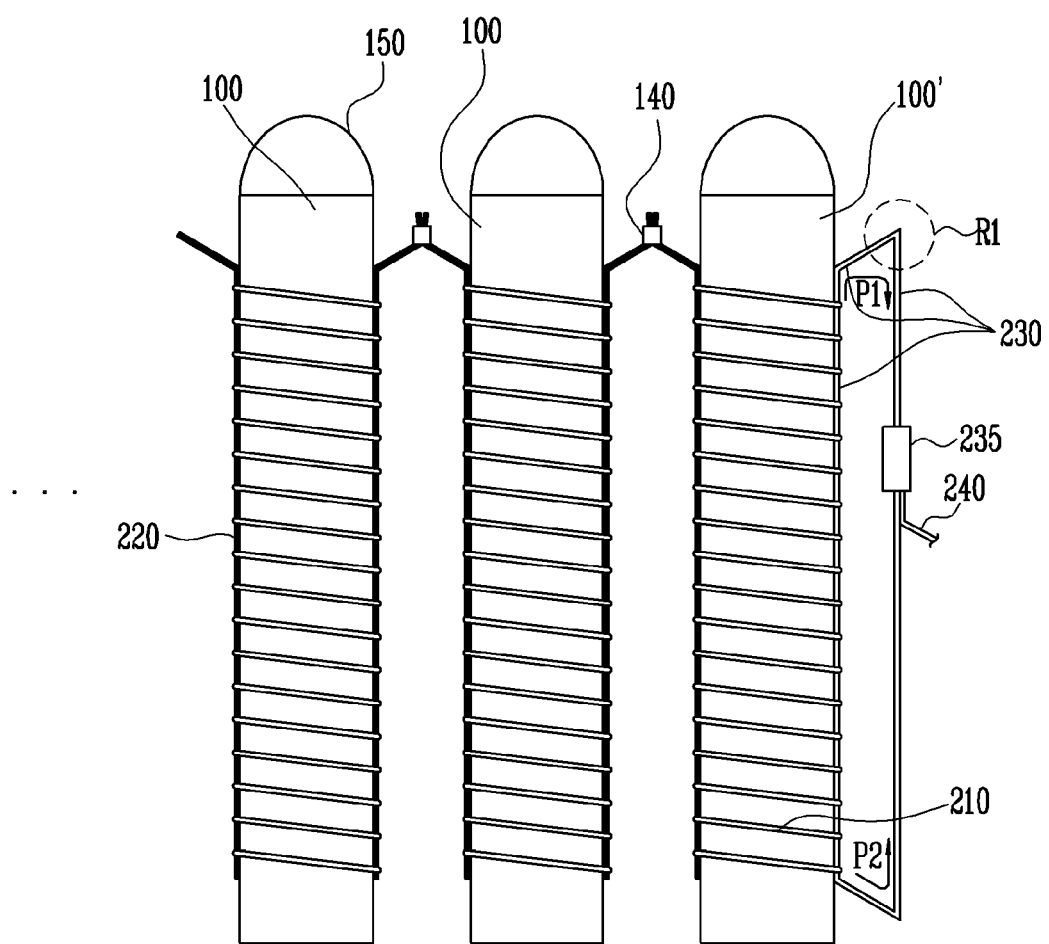
FIG. 2 is a front view showing a collecting structure of the unit cells and a stack according to an embodiment.

Referring to FIGS. 1 and 2, unit cells 100 and an array method of the same for a comparative example 1 will be described. FIG. 1 is a cross-sectional view showing an interlayer configuration of a plurality of unit cells 100, and FIG. 2 is a front view schematically showing a collecting structure of the plurality of unit cells 100 and a stack.

The plurality of unit cells 100 is configured to receive reformed fuel from a fuel converter (not shown) and configured to produce electricity by an oxidation reaction. The plurality of unit cells 100 are formed in a tube configuration as shown in FIGS. 1 and 2. The tubular unit cell 100 illustrated in FIG. 1 may be laminated with a first electrode layer 130, an electrolyte layer 120 and a second electrode layer 110 radially from central axis thereof. The plurality of unit cells 100 is formed as an anode-supported or a cathode-supported type of fuel cell stack depending upon their proposed use. That is, during operation of an anode-supported type solid oxide fuel cell, the first electrode layer 130 functions as a anode, and the second electrode layer 110 functions as a cathode. In a cathode-supported type, inversely, the first electrode layer 130 functions a cathode, and the second electrode layer 110 functions as an anode.

On the other hand, the cathode may be formed with a material having high ion conductance and/or electronic conductance, such as $LaMnO_3$-base or $LaCoO_3$-base. The cathode may be manufactured with a pure electronic conductor or a mixed conductor that is stable in oxidizing atmosphere and/or that would not chemically react with the electrolyte layer. The electrolyte layer is configured to be the moving passage for oxygen ions produced from the cathode and hydrogen ions produced from the anode. Such an electrolyte layer may be formed of compact ceramic material that the gas may not penetrate. The anode may be formed of ceramic material such as YSZ (yttria-stabilized zirconia) similar to that described above. In some embodiments, it is preferable to use metal ceramic cermet such as NiO-8YSZ or Ni-8YSZ that is inexpensive and stable in a high-temperature reducing atmosphere.

As shown in FIG. 1, an internal collector 142 is provided in contact with an inner periphery of a first electrode layer 130 and configured to collect current from inside of the first electrode layer 130. If necessary, a felt layer 141 may be provided between the anode 130 and the internal collector 142. In this case, the felt layer 141 is formed by a porous member, which is configured to pass the fuel and also function as a collector, thereby improving current collecting efficiency. If necessary, a supporting tube 143 may be provided inside the internal collector 142. The supporting tube 143 may be formed, for example, by SUS steel, etc. and be configured to support the entire structure of the unit cells 100. The supporting tube 143 also forms a flow path for reformed fuel, and functions to adhere the internal collector 142 to the anode 130 or the felt layer 141.

External collectors 210, 220 configured for collecting current are provided on an outer periphery of the plurality of unit cells 100. The external collectors 210, 220 may be provided as a single collector (not shown) or they may be provided as a first external collector 210 and a second external collector 220.

As shown FIG. 2, the second external collector 220 is provided along a longitudinal direction on the outer periphery of the plurality of unit cells 100. The second external collector 220 is connected to a second connecting member 140. The second connecting member 140 may include various fastening members, components or compositions to connect to the second external collector 220. The first external collector 210 may be wound along an outer periphery of the second external collector 220 and one of the plurality of unit cells 100. The external collector 210, 220 is typically a wire. The external collector 210, 220 may be formed of nickel (Ni) or silver (Ag). Each of the plurality of unit cells 100 may be arranged so that the central axis thereof is vertical, and the plurality of unit cells 100 are arranged and electrically connected to form a stack. Further, according to the scheme using the plurality of unit cells 100, it is also possible to provide a cap 150 on top of one or more of the plurality of unit cells 100.

On the other hand, as described above, to form a stack, the plurality of unit cells 100 arranged vertically are electrically connected to each other. Since a distal unit cell 100' among the plurality of unit cells 100 forming the electrical connection should collect large-capacity current (or electrons) including addition of the current collected from a number of the plurality of unit cells, the distal unit cell 100' should use the collector having a sectional area larger than the external collector 210, 220 provided in each of the plurality of unit cells 100. Therefore, in various embodiments, a first stack collecting member 230 is formed in a bar or plate shape. In particular, the first stack collecting member 230 is provided so that one side contacts an outside surface of the distal unit cell 100' (or other of the plurality of unit cells 100) in the longitudinal direction. A second stack collecting member 240 may be connected to another side of the first stack collecting member 230. In operation, the second stack collecting member 240 acts as a path for transferring the collected current or electrons to an external circuit or component. The first and second stack collecting member 230, 240 are fixed to a connecting member 235 and/or are electrically connected to the first connecting member 235. The first connecting member 235 may include a component for fastening such as a clamp. A plurality of the distal unit cells 100' may each have the same configuration or be formed of the same materials, but each may be positioned at different parts of the fuel cell stack.

The first stack collecting member 230 may be formed having a loop so that the path from the unit cells 100 to the second stack collecting member 240 is formed having at least two paths P1 and P2. In this case, resistive loss while reaching up to the second stack collecting member 240 may be reduced as compared with the case formed by a single path. Additionally, the cross-sectional area of the first stack collecting member 230 may be reduced. Further, a reduction in the cross-sectional area of the first stack collecting member 230 reduces the load applied to a peak portion R1 in the top of the first stack collecting member 230.

Silver (Ag) having low electrical resistivity and high electrical conductance may be used to form at least a portion of the first and second stack collecting member 230, 240. As described above, the loads of the first and second stack collecting member 230, 240 are applied to the top of the first stack collecting member 230, particularly, the peak portion R1, which thereby increases risk of fracture during operation of the stack. Hereinafter, the collecting configuration minimizing such a fracture will be described by each embodiment.

Embodiment 1

Figure 3:
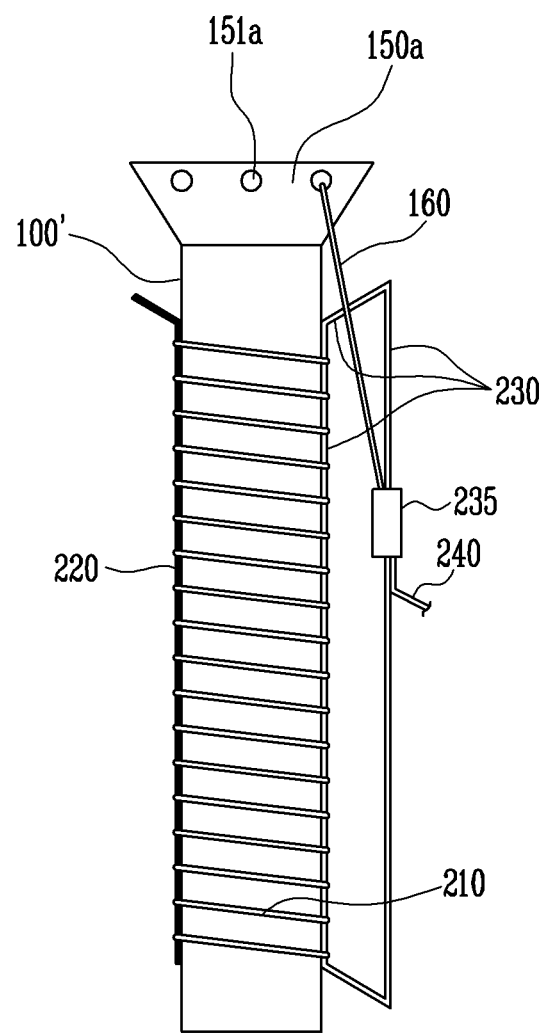
FIG. 3 is a front view showing a stack collecting structure of an embodiment.

With reference to FIG. 3, the stack collecting structure of one embodiment will be described. FIG. 3 is a front view showing a stack collecting structure of an embodiment.

As described above, the first stack collecting member 230 contacts the distal unit cells 100' among a plurality of electrically connected unit cells 100. Further, the second stack collecting member 240 is fixed and electrically connected to the first stack collecting member 230 by a first connecting member 235. One side contacting the illustrated distal unit cell 100' among the first stack collecting member 230 is wound together with the distal unit cell 100' by the first external collector 210. This configuration improves both current collecting efficiency and structural safety.

A cap 150a is provided in a top end of the distal unit cell 100'. The cap 150a is formed with a through hole 151a perforated transversely. A number of through holes 151a may be formed according to the number of the suspending members 160 to be described later. On the other hand, since the cap 150a is also exposed to high temperatures when driving the fuel cell while sealing the top end of the distal unit cell 100', it is preferable to form the cap 150a of the same material as the material forming the outer periphery of the unit cells 100, 100', that is, the material of the second electrode layer 110 illustrated in FIG. 1. When formed of different materials, the cap 150a is made of a material having a thermal expansion coefficient difference of about 5% from that of the second electrode layer material. This difference in thermal expansion coefficient helps to minimize fracture risk due to the heat. In some embodiments, the cap 150a is formed of a nonconductive material. In some embodiments, the cap 150a is formed of a ceramic material such as $Al_2O_3$.

The suspension member 160 is formed having a wire shape. One end of the suspension member 160 is suspended from and perforating the through hole 151a of the cap 150a, and the other end thereof is fixed to the first connecting member 235 or the second stack connecting member 240. Further, one end of the suspension member 160 may be fixed to the first connecting member 235 or the second stack connecting member 240, and the other end may be fixed to the first connecting member 235 or the second stack connecting member 240 after perforating the through hole 151a of the cap 150a. The suspension member 160 maintains a strong tension and is configured to distribute the weights of the first and second stack collecting member 230, 240. The suspension member 160 may be formed of a material having a melting point of between about 1500° C. and about 1600° C. The suspension member 160 may be configured not to degrade or fracture at the operating temperature of solid oxide fuel cell. The suspension member 160 may be formed of a heat-resistant nickel alloy, for example, an alloy such as inconel. The inconel alloy is a heat-resistant alloy, having nickel as its main component. Iconel may be formed of, for example, about 15%, chromium (Cr), about 6% to about 7%, iron (Fe), about 2.5% titanium (Ti), about 1% or less of aluminum (Al), manganese (Mn) and silicon (Si). The iconel alloy is relatively heat-resistant and resistant to oxidation, even in an oxidation air current of 900° C. or more and/or in sulfur-containing atmosphere.

Embodiment 2

Figure 4A:
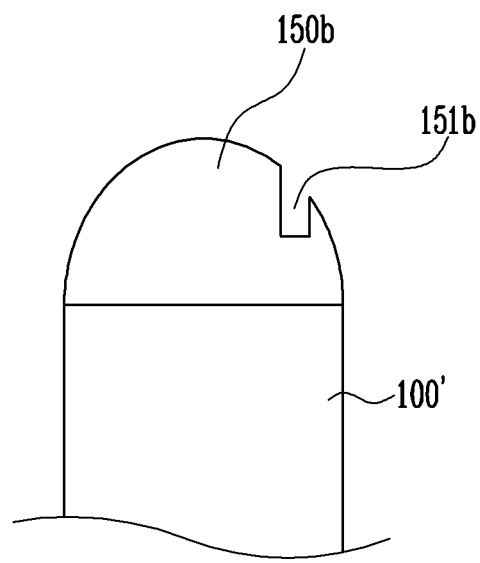
FIG. 4A is a front view showing a shape for a cap of anther embodiment.
Figure 4B:
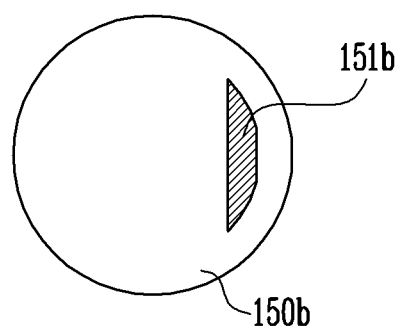
FIG. 4B is a plan view schematically showing the shape for the cap of FIG. 4A.

Referring to FIGS. 4A and 4B, the cap according to another embodiment will be described. FIG. 4A is a front view showing a shape of a cap of anther embodiment, and FIG. 4B is a plan view schematically showing the shape of the cap of FIG. 4A. The cap 150b may be formed with a groove 151b instead of the through hole. The groove 151b is formed by forming steps of a predetermined depth from the top of the cap 150b transversely from one side to the other side. In this case, the suspension member is simply suspended from the groove 151*b* without perforating the through hole 151*a* as illustrated in FIG. 3 of Embodiment 1. On the other hand, as shown in FIGS. 4A and 4B, there is no limit to the shape of the portion except the groove 151*b*. If the suspension member may be suspended, there is no limit even in standards of the shape, depth and area, etc. of the groove 151*b*.

Embodiment 3

Figure 5A:
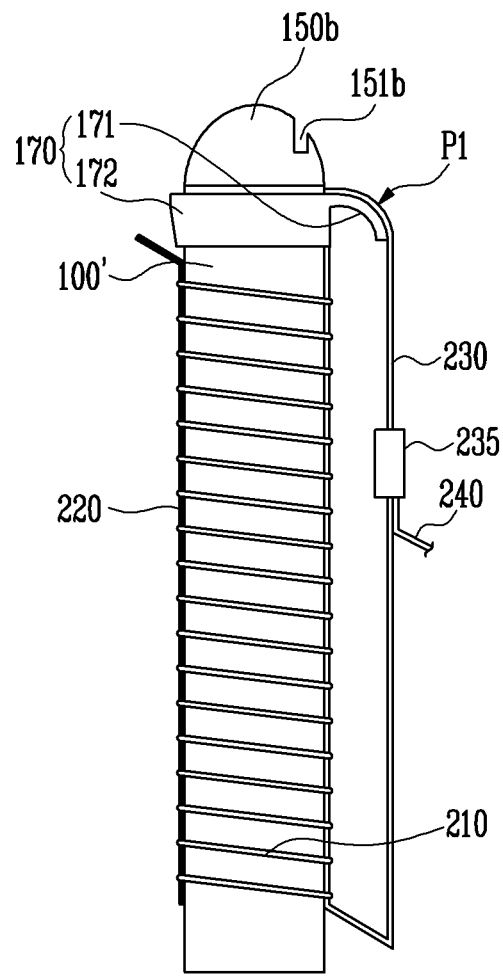
FIG. 5A is a front view showing the stack collecting structure of anther embodiment.
Figure 5B:
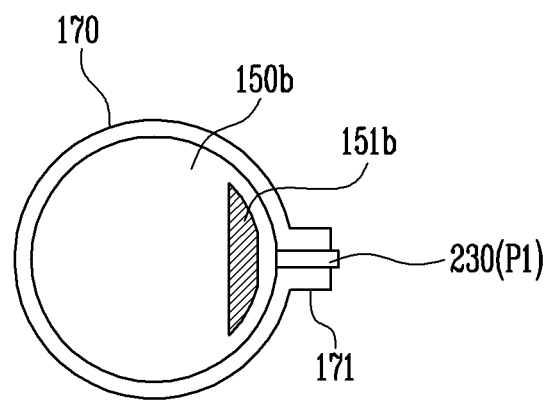
FIG. 5B is a plan view showing the stack collecting structure of the cap of FIG. 5A.

Referring to FIGS. 5A and 5B, the stack collecting structure according to another embodiment will be described. FIG. 5A is a front view showing the stack collecting structure of anther embodiment, and FIG. 5B is a plan view showing the stack collecting structure of FIG. 5A. Just, for ease of description, the suspension member 160 illustrated in FIG. 3 is not shown. In Embodiment 3, a supporting member 170 is provided to distribute the weight applied to the top of the first stack collecting member 230. The supporting member 170 includes a body 172 and a supporter 171. The body 172 is formed in a shape of ring, such that the top end of the distal unit cells 100' is fixed and inserted into the inside of the body 172. The supporter 171 is extended radially from one side of the body 172. The top surface of the supporter 171 contacts the top of the first stack collecting member 230. The supporter 171 may be formed of a curved surface so that the contact surface of the first stack collecting member 230 contacting the supporter 171 may receive and support the predetermined weight. In this case, it is also preferable to form the contact surface of the first stack collecting member 230 contacting the supporter 171 as the curved surface.

Embodiment 4

Figure 6:
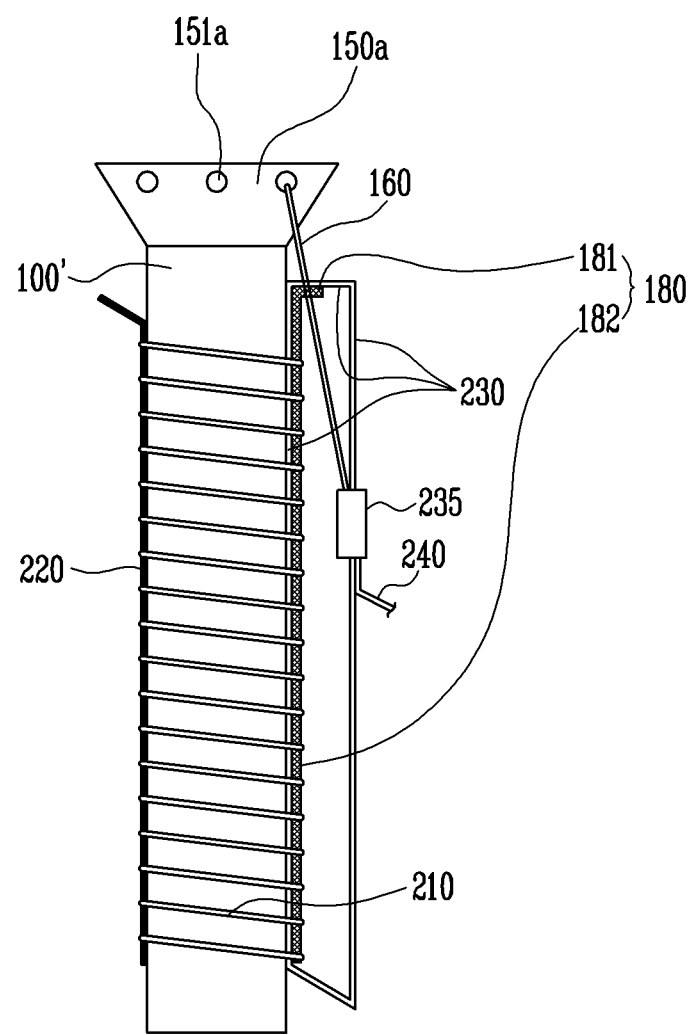
FIG. 6 is a front view showing the stack collecting structure of anther embodiment.

In FIG. 6, the stack collecting structure of another embodiment will be described. FIG. 6 is a front view showing the stack collecting structure of another embodiment. Embodiment 4 illustrates a supporting member 180. The supporting member 180 includes a body 182 and a supporter 181. The body 182 is formed in a shape of plate, strip or bar, wounded into the distal unit cells 100' and the first external collector 210. That is, the body 182 is wound by the first external collector 210 without configurations for separate support, and therefore, is fixed to the distal unit cells 100'. On the other hand, the supporter 181 is extended toward the outside from the top of the body 182. The top of the first stack collecting member 230 is suspended to the top of the supporter 181. On the other hand, as was the case in Embodiment 3, even in the present disclosure it is possible to evenly distribute the weight applied to the top of the first stack collecting member 230 by forming the supporter 181 as the curved surface.

Furthermore, the stability of the stack collector may be improved by distributing its weight. Additionally, a structural stability of the stack collector may be maintained for long periods of time even at oxidizing atmosphere and high temperature when driving the fuel cell stack.

While the present disclosure has been described in connection with certain exemplary embodiments, it will be appreciated by those skilled in the art that various modifications and changes may be made without departing from the scope of the present disclosure. The drawings and the detailed description of certain inventive embodiments given so far are only illustrative, and they are only used to describe certain inventive embodiments, but are should not used be considered to limit the meaning or restrict the range of the present disclosure described in the claims. Indeed, it will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Therefore, it will be appreciated to those skilled in the art that various modifications may be made and other equivalent embodiments are available. Accordingly, the actual scope of the present disclosure must be determined by the spirit and scope of the appended claims, and equivalents thereof

What is claimed is:

1. A solid oxide fuel cell stack, comprising:
  a plurality of unit cells including a distal unit cell;
  an external collector contacting an outer periphery of each of the plurality of unit cells and electrically connecting the unit cells to each other;
  a first stack collecting member configured to collect electricity from the distal unit cell;
  a second stack collecting member fixed to the first stack collecting member and electrically connected to a load;
  a cap provided in one end of the distal unit cells; and
  a suspension member, in which one side thereof is suspended from the cap and another side is fixed to the second stack collecting member, the suspension member configured to distribute weight of the first stack collecting member and the second stack collecting member, wherein the suspension member is formed as a wire, and wherein the suspension member is formed of heat-resistant nickel alloys.

2. The solid oxide fuel cell stack of claim 1, wherein the first stack collecting member forms at least two electrical paths from the plurality of unit cells to the second stack collecting member.

3. The solid oxide fuel cell stack of claim 1 further comprising a connecting member electrically connecting the first stack collecting member and the second stack collecting member to each other, wherein the suspension member is mechanically connected to the connecting member.

4. The solid oxide fuel cell stack of claim 1, wherein the suspension member is formed of a material having a melting point of between about 1500° C. and about 1600° C.

5. The solid oxide fuel cell stack of claim 1, wherein the cap is formed with a transversely perforated through hole with the suspension member suspended therethrough.

6. The solid oxide fuel cell stack of claim 1, wherein the cap is formed with grooves positioned transversely from a top thereof, and wherein the suspension member is suspended from at least one of the grooves.

7. The solid oxide fuel cell stack of claim 6, wherein the cap is formed of a material having a thermal expansion coefficient of about 5% difference from that of a material forming outer periphery of the unit cells.

8. The solid oxide fuel cell stack of claim 6, wherein the cap is formed of nonconductive materials.

9. The solid oxide fuel cell stack of claim 8, wherein the cap is formed of a ceramic material.

10. The solid oxide fuel cell stack of claim 1 further comprising a supporting member including a body fixed to the unit cells and a supporter configured to support the top of the first stack collecting member.

11. The solid oxide fuel cell stack of claim 10, wherein the body is formed in a ring shape having one end of at least one of the plurality of unit cells inserted therein.

12. The solid oxide fuel cell stack of claim 10, wherein the body is formed in a strip shape contacting a longitudinal direction at least one of the plurality of unit cells, and the external collector is wound around an outer periphery of at least one of the plurality of unit cells.

13. The solid oxide fuel cell stack of claim 10, wherein the supporter is formed having a downwardly curved surface shape.

14. The solid oxide fuel cell stack of claim 1, wherein the plurality of unit cells are formed having a tubular shape.

15. The solid oxide fuel cell stack of claim 14, wherein center axes of each of the unit cells are arranged vertically.

16. The solid oxide fuel cell stack of claim 15, wherein the cap is provided in the top end of the unit cells.

* * * * *